Sept. 11, 1945.    D. C. VARMA    2,384,713
CUSHION SEAT
Filed Aug. 6, 1942    2 Sheets-Sheet 1
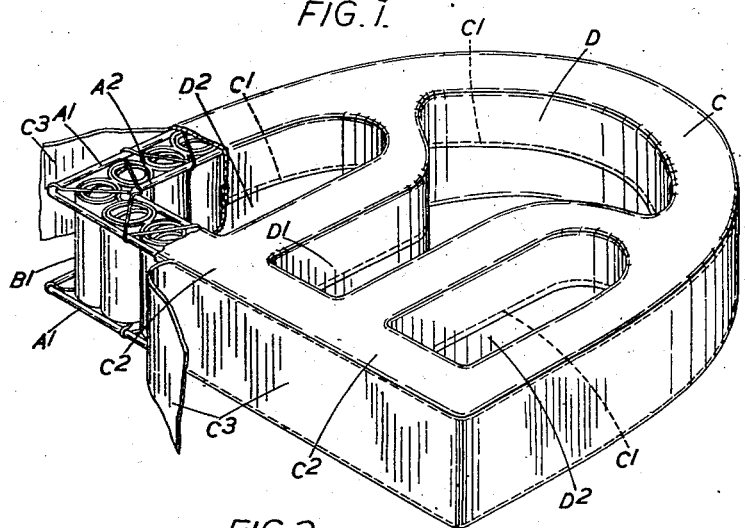
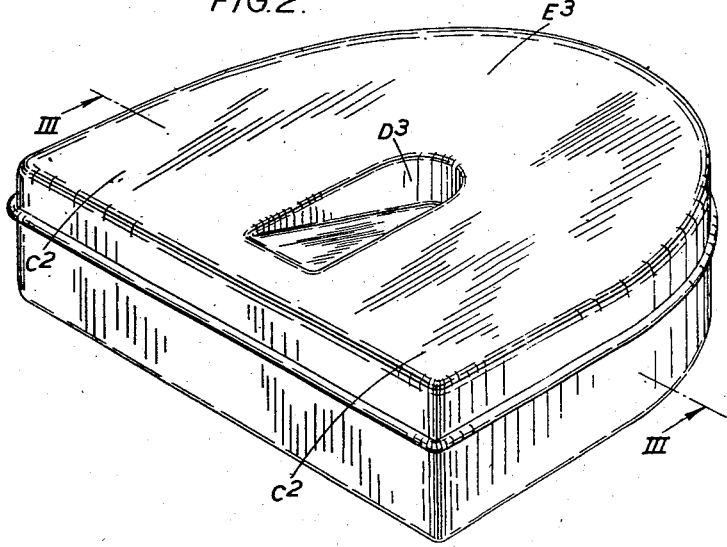
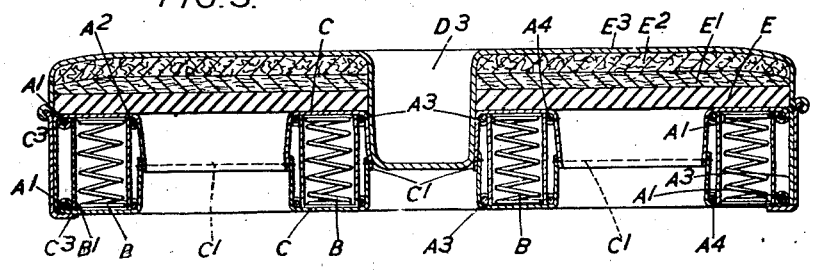
INVENTOR
D. C. VARMA
BY
ATTORNEYS Sept. 11, 1945.　　　D. C. VARMA　　　2,384,713
CUSHION SEAT
Filed Aug. 6, 1942　　　2 Sheets-Sheet 2
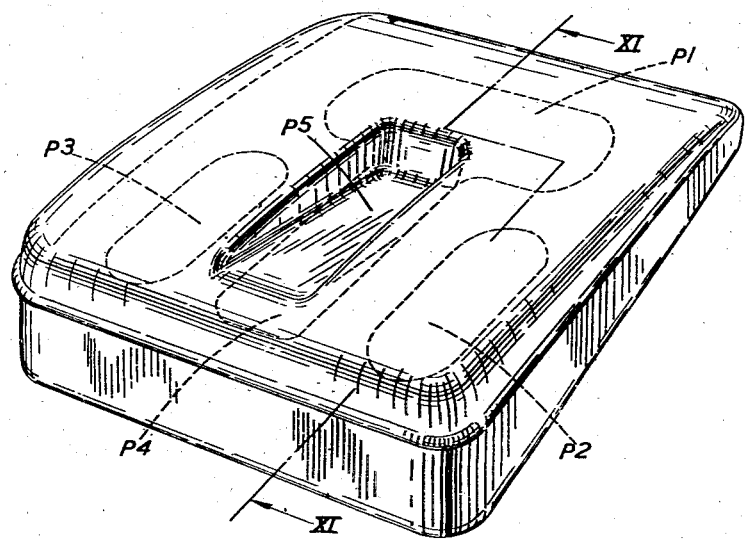
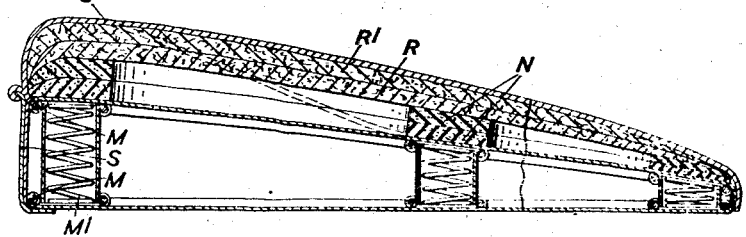
INVENTOR
D. C. VARMA
BY
ATTORNEYS Patented Sept. 11, 1945

2,384,713

UNITED STATES PATENT OFFICE 2,384,713

CUSHION SEAT

Dewan Chand Varma, London, England

Application August 6, 1942, Serial No. 453,881
In Great Britain July 26, 1941

2 Claims. (Cl. 155—179)

This invention relates to cushion seats, for use for example on chairs or forms or in motor cars or aeroplanes or on motor bicycle saddles or saddles for horse-riding.

The invention has for its object to provide a resilient seat which will not only ensure comfort in use, but will also minimise risk of illness (such for example as prostate gland trouble) developing in course of time as the result, at least in part, of undue pressure on certain parts of the body.

A cushion seat according to the invention comprises a resilient pad having a more or less central cavity or recess between two thigh-supporting portions, and three areas more yielding than the main body of the pad, one of which is located behind the central cavity or recess to receive the base of the pelvis and more especially the coccyx and the two ischium bones, whilst the other two are provided respectively in the two thigh-supporting portions to receive the portions of the thigh muscles at the backs of the legs, the main body of the pad extending completely around such more yielding areas in order to provide support on all sides thereof. The remaining portions of the pad around and between the more yielding areas and the central recess afford the necessary support to the parts of the body which need the support or can take the pressure without risk of harm.

Each more yielding area may be formed by an insert of more yielding material or by a cavity which is preferably covered by the upper surfacing of the pad. Whilst other materials may be used, it is preferred to make the pad wholly or in part of sponge rubber or of moulded soft rubber.

The invention may be carried into practice in various ways but two constructions, each embodying the invention, are shown by way of example in the accompanying drawings, in which Figure 1 shows, in perspective, two supporting frames separated by springs and having the openings formed therein, Figure 2 is a similar view of the cushion seat but with the outer coverings applied to the supporting frames, Figure 3 is a section on the line III—III of Figure 2, Figure 4 is a perspective of a seat squab incorporating the invention, and Figure 5 shows the squab in section on the line XI—XI of Figure 4.

In the construction shown in Figures 1 to 3 the cushion seat comprises upper and lower frames each including an external metal rim $A^1$ shaped to impart the desired external contour to the cushion and extending around three shaped inner rims $A^2$, $A^3$ and $A^4$, the rims being braced by metal cross-wires as shown in Figure 1. The two frames are separated by a number of springs B which may be of any suitable form, for example true cylindrical helices or squared or rectangular helices or spiral helices, the springs being enclosed by canvas pocketing strips $B^1$. Each frame is covered by a piece of fabric C, for example of canvas, which is secured around the edges to the outer rims $A^1$. The fabric C of each frame is cut at the three openings formed by the inner rims $A^2$, $A^3$ and $A^4$ and the canvas is folded into these openings and secured as shown at $C^1$. There are thus three holes extending through the two frames, namely a central hole, the back portion D of which will register with the base of the pelvis and will receive the coccyx and the two ischium bones whilst its forward portion $D^1$ lies between the two thigh-supporting portions $C^2$, and two holes $D^2$ lying in the thigh-supporting portions $C^2$ and adapted to receive the portions of the thigh muscles at the backs of the legs. The unit or base thus formed is furnished with an edging strip $C^3$, for example of canvas, which is secured to the rims $A^1$.

Arranged over the upper surface of the basic unit is a layer E of sponge rubber or soft moulded rubber, a layer $E^1$ of horsehair and a layer $E^2$ of wadding, the whole being then furnished with a final covering $E^3$, for example of leather. As clearly shown in Figure 3, the leather is folded down into the opening $D^1$ so as to form the open inclined recess $D^3$ in the finished cushion shown in Figure 2.

Thus in addition, to the central recess $D^3$ for the scrotum, the seat comprises three areas which are more yielding than the main body of the cushion, namely the resilient part immediately over the opening D and the two resilient parts immediately over the openings $D^2$.

Figures 4 and 5 show the invention as applied to a squab of the type usually employed in motor cars. In this arrangement two metal frames M covered with canvas and separated by springs $M^1$ are superimposed in a manner generally similar to that described with reference to Figure 1. Arranged over the upper canvas-covered frame are two layers of sponge rubber N each having three openings $P^1$, $P^2$, $P^3$ therein. Arranged over the rubber layers is a layer of horsehair R and a layer of wadding $R^1$, the cushion as a whole being covered with leather S. As in the construction described with reference to Figures 1 to 3, the leather top S is folded down into the forwardly extending portion $P^4$ of the cavity $P^1$ so as to form an elongated trough $P^5$ in the top surface of the cushion, though it will be understood in each of the constructions described the central hole or recess may be covered by the outer leather or other covering provided this is sufficiently flexible and loose to sag readily into the central recess.

It will be understood that the arrangements described are given as examples only and that details of construction and shape may be varied to suit requirements. For example, where soft moulded rubber has been described sponge rubber may be employed and vice versa, the tendency for overheating being counteracted, if desired, by mixing a suitable substance, for example leather dust, in the rubber.

What I claim as my invention and desire to secure by Letters Patent is:

1. A cushion seat comprising two superimposed frames, springs between the frames normally tending to urge then apart, such springs being arranged to leave an approximately central unoccupied space and three additional unoccupied spaces, a resilient layer covering the said three additional spaces, and means for holding the parts together, the whole forming a resilient pad having two thigh-supporting portions with an approximately central cavity between them, and three areas more yielding than the main body of the pad, one of such areas being located behind the central cavity to receive the base of the pelvis and more especially the coccyx and the two ischium bones, whilst the other two lie respectively in the two thigh-supporting portions to receive the portions of the thigh muscles at the backs of the legs the main body of the pad extending completely around each such more yielding area in order to provide support on all sides thereof.

2. A cushion seat comprising a pair of main external superimposed rims, springs acting between these rims and normally tending to urge them apart, three subsidiary pairs of rims within the main rims, one of said subsidiary pairs of rims enclosing an enclosed space extending approximately centrally along the pad from the front towards the rear where the space opens out to form a generally oval space to register with the base of the pelvis, whilst the other two pairs of subsidiary rims define elongated spaces in the thigh-supporting parts of the pad on opposite sides respectively of the forward or elongated part of the central space, at least one layer of resilient material covering the rearward oval portion of the central space and also the two spaces in the thigh-supporting portions, and a covering extending over the upper and side portions of the pad, said covering being folded into the forward elongated portion of the central unoccupied space thus forming an elongated recess in the upper surface of the pad adjacent to the scrotum.

DEWAN CHAND VARMA.